(12) United States Patent
Huang et al.

(10) Patent No.: US 9,811,231 B2
(45) Date of Patent: Nov. 7, 2017

(54) TOUCH PANEL FOR REDUCING PINS REQUIRED FOR TOUCH DETECTION

(71) Applicant: Wistron Corporation, New Taipei (TW)

(72) Inventors: Tzu-Chieh Huang, New Taipei (TW);
Tung-Yang Tang, New Taipei (TW);
Hua-Min Tseng, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/097,288

(22) Filed: Apr. 13, 2016

(65) Prior Publication Data
US 2017/0255303 A1   Sep. 7, 2017

(30) Foreign Application Priority Data

Mar. 4, 2016 (TW) .............................. 105106663 A (51) Int. Cl.
  *G06F 3/047* (2006.01)
(52) U.S. Cl.
  CPC .... *G06F 3/047* (2013.01); *G06F 2203/04111* (2013.01)
(58) Field of Classification Search
  CPC ........... G06F 3/044; G06F 2203/04111; G06F 2203/04107
  See application file for complete search history.

(56) References Cited

U.S. PATENT DOCUMENTS

| 8,072,429 B2 | 12/2011 | Grivna |
| 2009/0085891 A1* | 4/2009 | Yang ...................... G06F 3/044 345/174 |
| 2010/0182275 A1* | 7/2010 | Saitou ................... G06F 3/044 345/174 |
| 2011/0192657 A1 | 8/2011 | Chen et al. |
| 2013/0120308 A1 | 5/2013 | Wang |
| 2015/0075959 A1* | 3/2015 | Lu ........................ G06F 3/0416 200/5 R |

FOREIGN PATENT DOCUMENTS

| CN | 104281306 | 1/2015 |
| TW | 201120716 | 6/2011 |

* cited by examiner

*Primary Examiner* — Nelson Rosario
*Assistant Examiner* — Chun-Nan Lin
(74) *Attorney, Agent, or Firm* — JCIPRNET (57) ABSTRACT

A touch panel including a substrate and a touch element is provided. The substrate has a predetermined number of touch areas. The touch element is disposed in the predetermined number of touch areas and includes a plurality of first electrodes, a plurality of second electrodes, and the predetermined number of third electrodes. Each third electrode includes a plurality of third electrode patterns and a plurality of third connection portions. Each third connection portion electrically insulatingly intersects at least one of the first electrodes or at least one of the second electrodes and electrically connects two adjacent third electrode patterns. Several of the first electrodes arranged in a first direction and corresponding to different touch areas are electrically connected, and several of the second electrodes arranged in a second direction and corresponding to different touch areas are electrically connected.

9 Claims, 10 Drawing Sheets

TOUCH PANEL FOR REDUCING PINS REQUIRED FOR TOUCH DETECTION

CROSS-REFERENCE TO RELATED APPLICATION

This application claims the priority benefit of Taiwan application serial no. 105106663, filed on Mar. 4, 2016. The entirety of the above-mentioned patent application is hereby incorporated by reference herein and made a part of this specification.

BACKGROUND OF THE INVENTION

Field of the Invention

The invention relates to a panel and particularly relates to a touch panel with fewer pins.

Description of Related Art

As the touch technology matures, touch panel is widely used in a variety of electronic products, such as mobile phones, tablet computers, laptop computers, and smart wearable devices. In recent years, touch panel is further used in large-sized electronic products, such as All In One (AIO) computers, electronic whiteboards, video conferencing systems, and so on.

As the size increases, however, the touch panel requires more channels for transmitting signals. For the same reason, the number of pins needed for touch detection also increases with the size of the touch panel. The more pins are disposed, the more touch chips need to be used. It not only increases the production costs of the touch panel and the load of hardware but also lowers the update rate. Therefore, how to reduce the number of pins required for touch detection is an issue that needs to be addressed in this field.

SUMMARY OF THE INVENTION

The invention provides a touch panel for reducing the number of pins required for touch detection.

A touch panel of the invention includes a substrate and a touch element. The substrate has a predetermined number of touch areas. The touch element is disposed in the predetermined number of the touch areas of the substrate. The touch element includes a plurality of first electrodes, a plurality of second electrodes, and the predetermined number of third electrodes. The first electrodes are arranged in a first direction in the predetermined number of the touch areas, and each of the first electrodes includes a plurality of first electrode patterns. The second electrodes are electrically insulated from the first electrodes and arranged in a second direction that intersects the first direction in the predetermined number of the touch areas, wherein each of the second electrodes includes a plurality of second electrode patterns, and orthogonal projections of the first electrode patterns and the second electrode patterns on the substrate have a plurality of gaps therebetween. The predetermined number of the third electrodes are electrically insulated from the first electrodes and the second electrodes and disposed in the predetermined number of the touch areas on a one-to-one basis. Each of the third electrodes includes a plurality of third electrode patterns and a plurality of third connection portions. Orthogonal projections of the third electrode patterns on the substrate are located in and fill the gaps, and the third electrode patterns do not overlap the first electrode patterns and the second electrode patterns. Each of the third connection portions electrically insulatingly intersects at least one of the first electrodes or at least one of the second electrodes and electrically connects adjacent two third electrode patterns. A plurality of the first electrodes arranged in the first direction and corresponding to different touch areas are electrically connected, and a plurality of the second electrodes arranged in the second direction and corresponding to different touch areas are electrically connected.

In an embodiment of the invention, each of the first electrodes further includes a plurality of first connection portions. Each of the first connection portions connects adjacent two first electrode patterns. Each of the second electrodes further includes a plurality of second connection portions. Each of the second connection portions connects adjacent two second electrode patterns. The first electrode patterns, the second electrode patterns, and the third electrode patterns are distributed in a same layer on the substrate.

In an embodiment of the invention, the first electrode patterns, the second electrode patterns, and the third electrode patterns respectively have a hexagonal shape, and a portion of the third connection portions are respectively disposed across at least one of the first connection portions and at least one of the second connection portions.

In an embodiment of the invention, the second direction is perpendicular to the first direction.

In an embodiment of the invention, a portion of the first electrode patterns respectively include a first sub-portion and a second sub-portion. Orthogonal projections of the first sub-portion and the second sub-portion on the substrate have a first sub-gap therebetween. Each of the first electrodes further includes a plurality of first sub-connection portions. An orthogonal projection of each of the first sub-connection portions on the substrate is located in one of the first sub-gaps, and each of the first sub-connection portions connects one of the first sub-portions and the corresponding second sub-portion. The first sub-connection portions located in a middle of each of the touch areas intersect the third connection portions, and the third electrode patterns connected with the third connection portions respectively extend into and fill one of the first sub-gaps.

In an embodiment of the invention, each of the first sub-connection portions located between adjacent two touch areas is disposed across adjacent two third electrode patterns in adjacent two touch areas.

In an embodiment of the invention, a portion of the second electrode patterns respectively include a third sub-portion and a fourth sub-portion. Orthogonal projections of the third sub-portion and the fourth sub-portion on the substrate have a second sub-gap therebetween. Each of the second electrodes further includes a plurality of second sub-connection portions. An orthogonal projection of each of the second sub-connection portions on the substrate is located in one of the second sub-gaps, and each of the second sub-connection portions connects one of the third sub-portions and the corresponding fourth sub-portion. The second sub-connection portions located in a middle of each of the touch areas intersect the third connection portions, and the third electrode patterns connected with the third connection portions respectively extend into and fill one of the second sub-gaps.

In an embodiment of the invention, each of the second sub-connection portions located between adjacent two touch areas is disposed across adjacent two third electrode patterns in adjacent two touch areas.

In an embodiment of the invention, the predetermined number of the touch areas is arranged in an array of (M×N). M and N are positive integers respectively greater than 1, and at least one of M and N is greater than 2. The predetermined number is (M×N). Every M number of first electrodes across different touch areas are electrically connected in parallel, and every N number of second electrodes across different touch areas are electrically connected in parallel.

Based on the above, the touch panel according to the embodiments of the invention further includes the third electrodes under the configuration of the two-dimensional touch array (the first electrodes and the second electrodes). The third electrodes are disposed respectively corresponding to one of the touch areas for determining the touch point accurately. Therefore, in the embodiments of the invention, multiple electrodes corresponding to different touch areas are electrically connected (that is, to share the same pin) to efficiently reduce the number of pins required for touch detection.

To make the aforementioned and other features and advantages of the invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
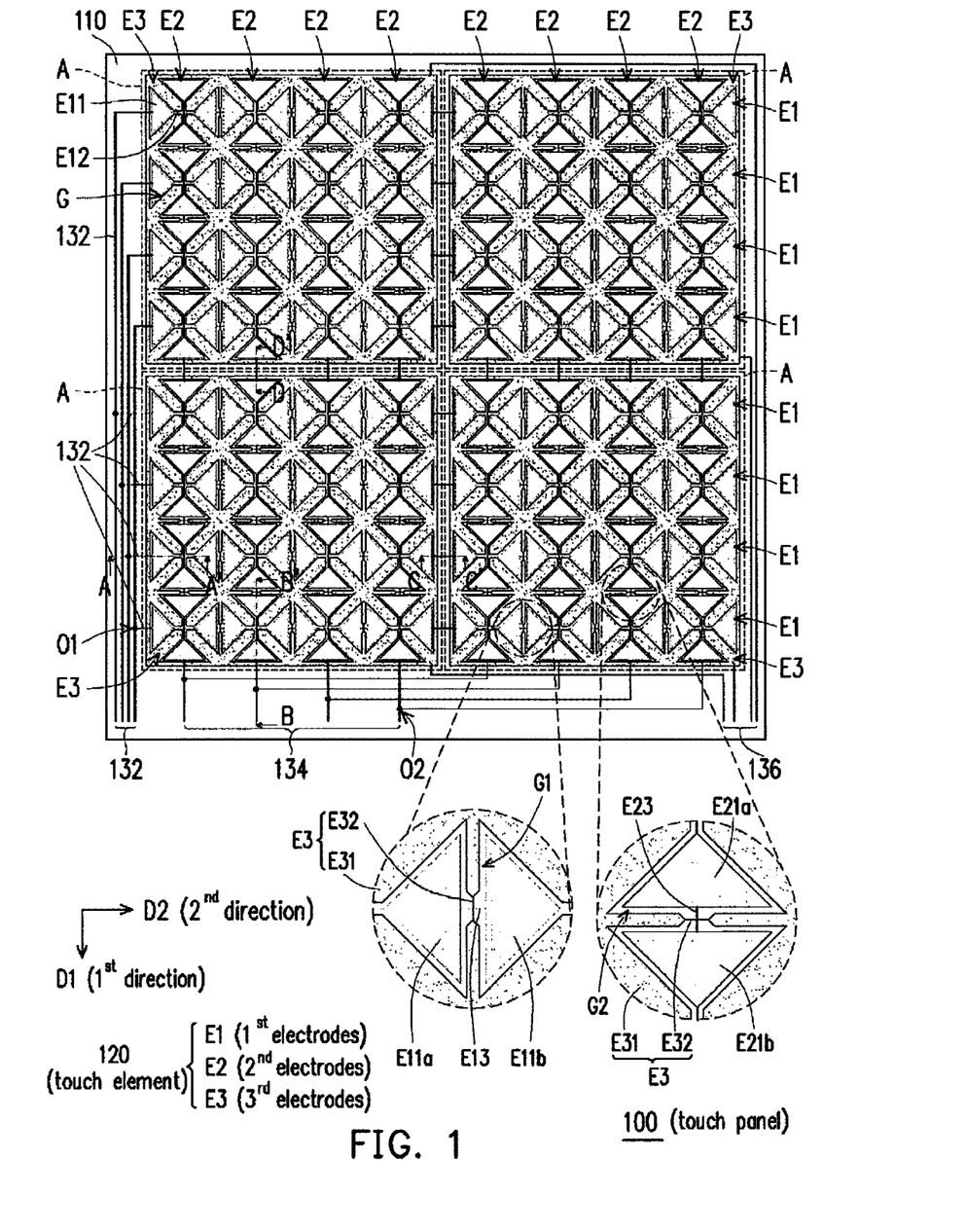
FIG. 1 is a schematic top view of a touch panel according to the first embodiment of the invention.
Figure 2A:
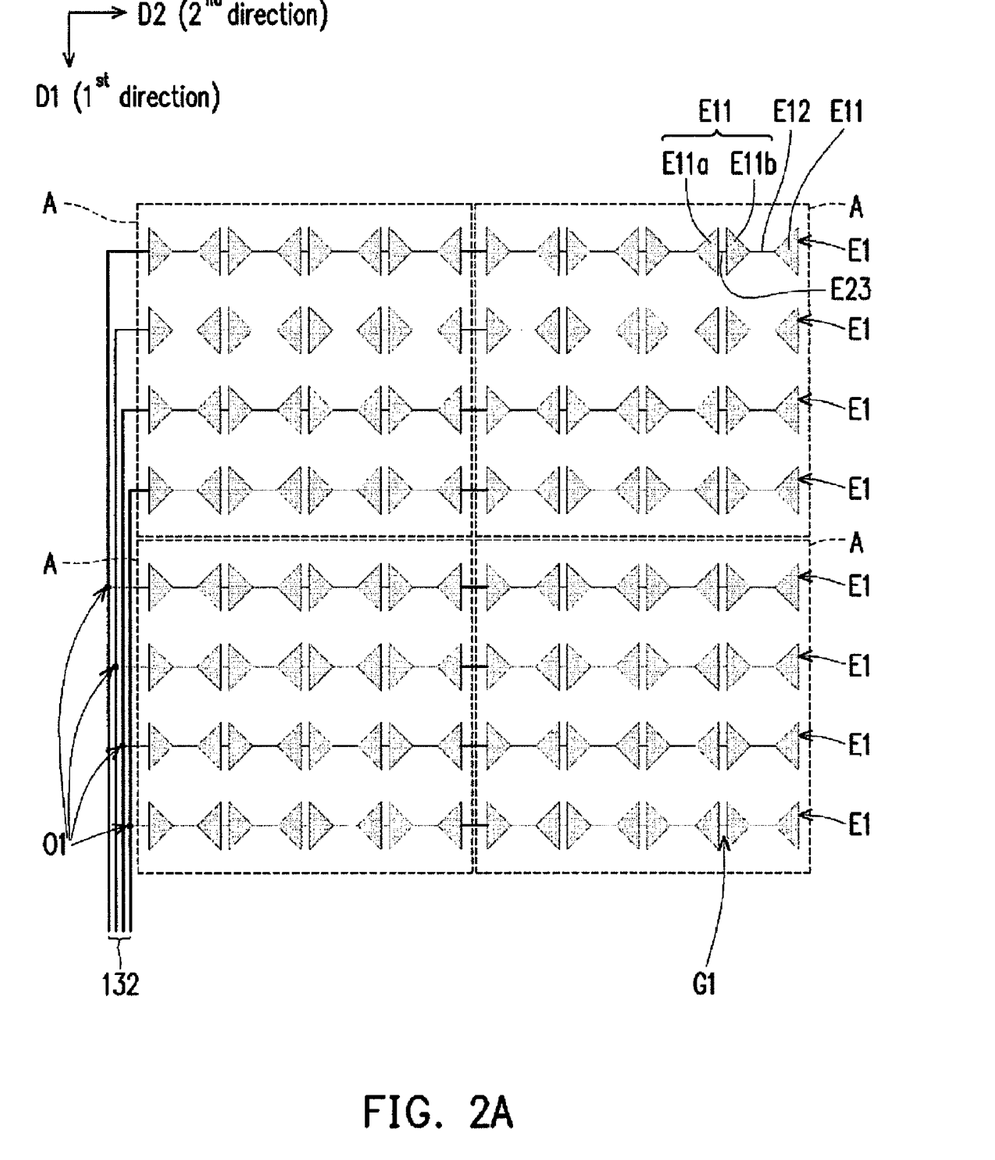
FIG. 2A is a schematic top view of the first electrodes and the first conductive lines of the touch panel of FIG. 1.
Figure 2B:
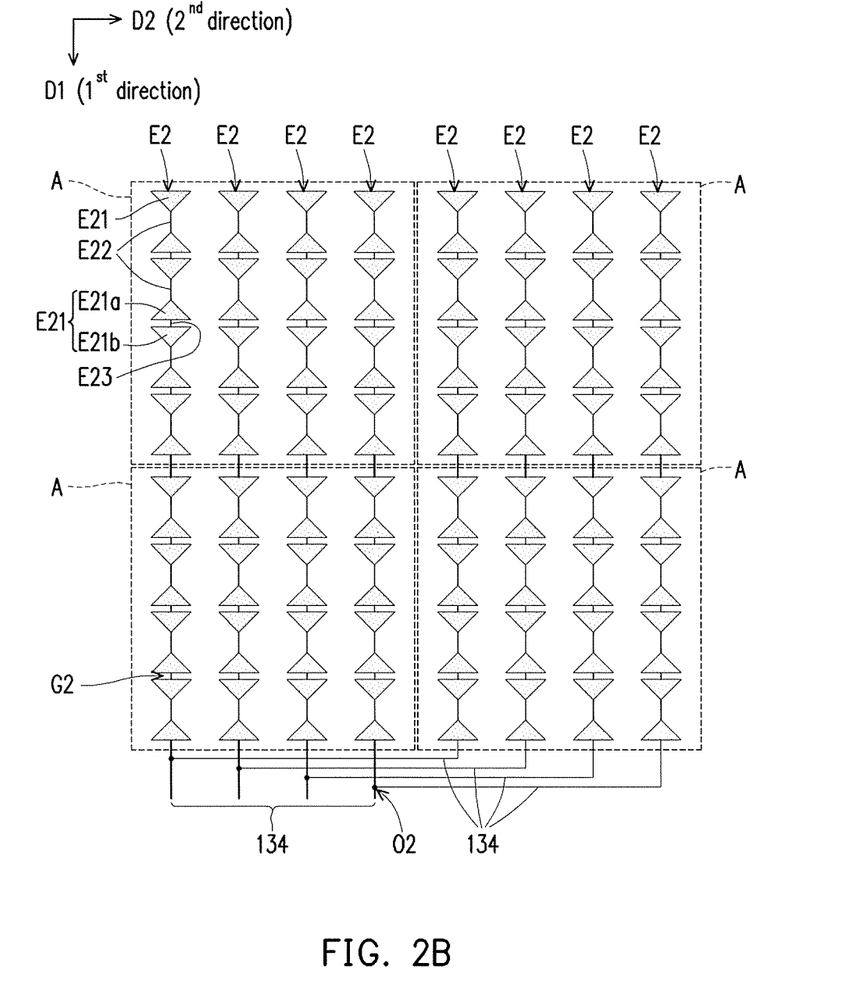
FIG. 2B is a schematic top view of the second electrodes and the second conductive lines of the touch panel of FIG. 1.
Figure 2C:
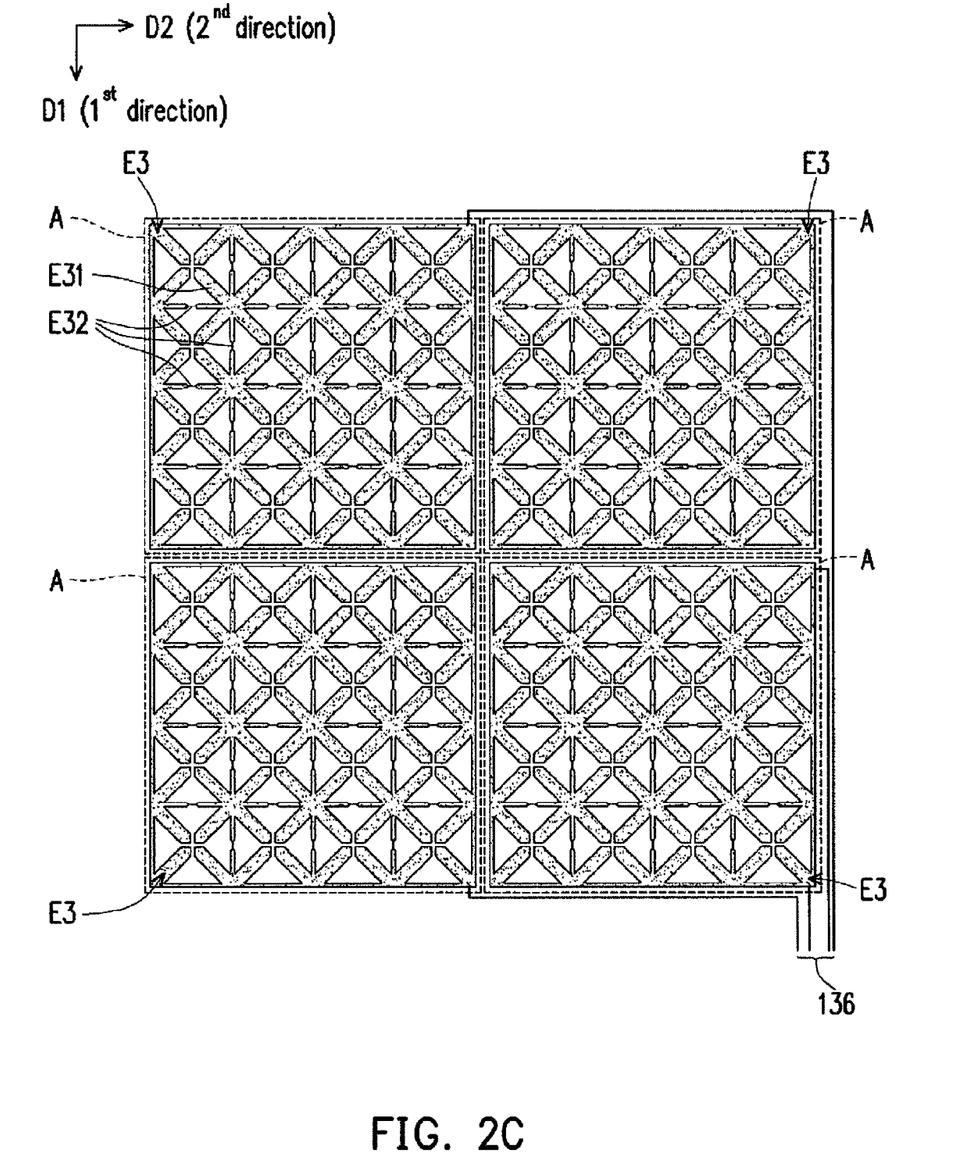
FIG. 2C is a schematic top view of the third electrodes and the third conductive lines of the touch panel of FIG. 1.

FIG. 1 is a schematic top view of a touch panel according to the first embodiment of the invention. FIG. 2A is a schematic top view of first electrodes and first conductive lines of the touch panel of FIG. 1. FIG. 2B is a schematic top view of second electrodes and second conductive lines of the touch panel of FIG. 1. FIG. 2C is a schematic top view of third electrodes and third conductive lines of the touch panel of FIG. 1. FIG. 3A to FIG. 3D are schematic cross-sectional views respectively taken along the section lines A-A', B-B', C-C', and D-D' in FIG. 1. Referring to FIG. 1 to FIG. 2C, a touch panel 100 includes a substrate 110 and a touch element 120.

The substrate 110 may be a cover plate or a substrate in a display panel. For example, the substrate 110 may be a glass substrate that has high mechanical strength or a flexible plastic substrate, but the invention is not limited thereto. The substrate 110 includes a predetermined number of touch areas A. In this embodiment, the number of the touch areas A is 4, and the four touch areas A are arranged in an array of (2×2). Nevertheless, the number of the touch areas A and the arrangement thereof may be changed as required and are not limited to the disclosure of FIG. 1.

The touch element 120 is disposed in the predetermined number of the touch areas A of the substrate 110. The touch element 120 includes a plurality of first electrodes E1, a plurality of second electrodes E2, and a predetermined number of third electrodes E3. In this embodiment, the number of the first electrodes E1 and the number of the second electrodes E2 are both 8, and the number of the third electrodes E3 is 4. Nevertheless, the numbers of the first electrodes E1, the second electrodes E2, and the third electrodes E3 may be changed as required and are not limited to the disclosure of FIG. 1 to FIG. 2C. A material of the first electrodes E1, the second electrodes E2, and the third electrodes E3 may include a translucent conductive material. For example, the material of the first electrodes E1, the second electrodes E2, and the third electrodes E3 may be selected from at least one of a metal oxide, nano silver, a carbon nanotube, and a metal grid, but not limited to the foregoing.

The first electrodes E1 are arranged in a first direction D1 in the predetermined number of the touch areas A, and each of the first electrodes E1 extends in a second direction D2 that intersects the first direction D1, for example. The second direction D2 is perpendicular to the first direction D1, for example, but the invention is not limited thereto. As shown in FIG. 2A, each first electrode E1 may include a plurality of first electrode patterns E11 and a plurality of first connection portions E12. Each first connection portion E12 connects adjacent two first electrode patterns E11. In this embodiment, each first connection portion E12 connects adjacent two first electrode patterns E11 in the second direction D2.

The second electrodes E2 are electrically insulated from the first electrodes E1 and are arranged in the second direction D2 in the predetermined number of the touch areas A, and each second electrode E2 extends in the first direction D1, for example. As shown in FIG. 2B, each second electrode E2 may include a plurality of second electrode patterns E21 and a plurality of second connection portions E22. Each second connection portion E22 connects adjacent two second electrode patterns E21. In this embodiment, each second connection portion E22 connects adjacent two second electrode patterns E21 in the first direction D1, but the invention is not limited thereto.

Orthogonal projections of the first electrode patterns E11 and the second electrode patterns E21 on the substrate 110 do not overlap one another, such that a plurality of gaps G (one gap G is illustrated in FIG. 1 as an example) are formed therebetween. Specifically, the first electrode patterns E11 and the second electrode patterns E21 may be distributed in the same layer on the substrate 110. That is, the first electrode patterns E11 and the second electrode patterns E21 may be formed in the same process by using the same material. Under this configuration, the first electrode patterns E11 and the second electrode patterns E21 are separated by a distance (e.g. a width of the gap G) to be electrically insulated from one another. Each second connection portion E22 intersects one of the first connection portions E12, and an insulating layer IN1 (see FIG. 3A and FIG. 3B) may be disposed between the second connection portion E22 and the first connection portion E12 to electrically insulate the second connection portion E22 from the first connection portion E12. In this embodiment, the insulating layer IN1 includes a plurality of island-shaped insulating patterns. Each insulating pattern is disposed on one of the first connection portions E12, and each second connection portion E22 is disposed across one of the insulating patterns to connect adjacent two second electrode patterns E21. Under this configuration, the second connection portions E22 and the second electrode patterns E21 are forming in different processes by using the same or different materials. However, in another embodiment, the first connection portions E12 and the second connection portions E22 may be stacked in a reverse order.

The predetermined number of the third electrodes E3 are electrically insulated from the first electrodes E1 and the second electrodes E2, and the predetermined number of the third electrodes E3 are disposed in the predetermined number of the touch areas A on a one-to-one basis. That is, the touch areas A and the third electrodes E3 have a one-to-one relationship. Each third electrode E3 includes a plurality of third electrode patterns E31 and a plurality of third connection portions E32. Orthogonal projections of the third electrode patterns E31 on the substrate 110 are located in and fills the gaps G, and the third electrode patterns E31 do not overlap the first electrode patterns E11 and the second electrode patterns E21. In this embodiment, the third electrode patterns E31 may be distributed in the same layer as the first electrode patterns E11 and the second electrode patterns E21 on the substrate 110, and the third electrode patterns E31 are disposed between the first electrode patterns E11 and the second electrode patterns E21 and are separated from the first and second electrode patterns by a distance, so as to be electrically insulated from the first and second electrode patterns. That is, the third electrode patterns E31 are not in contact with the first electrode patterns E11 and the second electrode patterns E21. Each third connection portion E32 electrically insulatingly intersects at least one of the first electrodes E1 or at least one of the second electrodes E2 and electrically connects adjacent two third electrode patterns E31.

Referring to FIG. 1 and FIG. 2A, a portion of the first electrode patterns E11 may respectively include a first sub-portion E11a and a second sub-portion E11b. Orthogonal projections of the first sub-portion E11a and the second sub-portion E11b on the substrate 110 have a first sub-gap G1 therebetween. Each first electrode E1 may further include a plurality of first sub-connection portions E13. An orthogonal projection of each first sub-connection portion E13 on the substrate 110 is located in one of the first sub-gaps G1, and each first sub-connection portion E13 connects one of the first sub-portions E11a and the corresponding second sub-portion E11b.

Figure 3A:
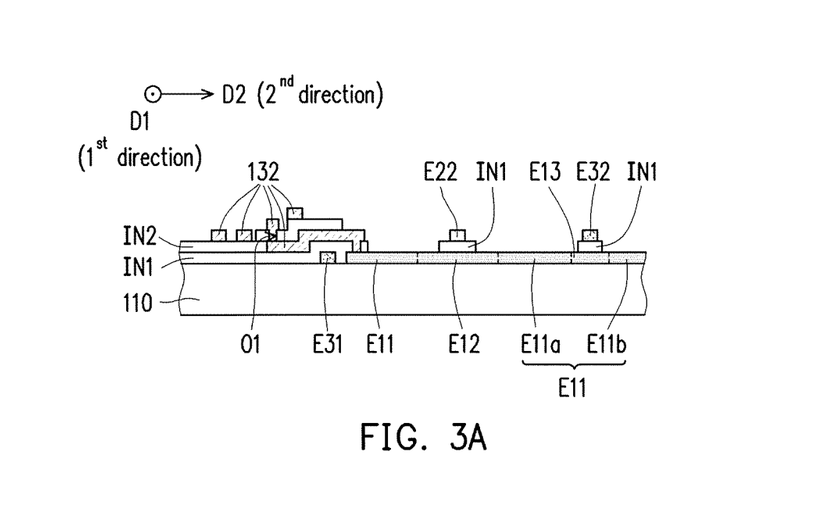
FIG. 3A to FIG. 3D are schematic cross-sectional views respectively taken along the section lines A-A', B-B', C-C', and D-D' in FIG. 1.

Referring to FIG. 1 and FIG. 3A, the first sub-connection portions E13 located in the middle of each touch area A intersect the third connection portions E32, and the third electrode patterns E31 connected with the third connection portions E32 respectively extend into and fill one of the first sub-gaps G1. The insulating layer IN1 may be disposed between the first sub-connection portions E13 and the third connection portions E32, so as to electrically insulate the first sub-connection portions E13 from the third connection portions E32. In this embodiment, the third connection portions E32 that intersect the first sub-connection portions E13 are formed after the insulating layer IN1. Therefore, the third connection portions E32 that intersect the first sub-connection portion E13 and the third electrode pattern E31 are formed in different processes by using the same or different materials. Nevertheless, the invention is not limited thereto.

Figure 3B:
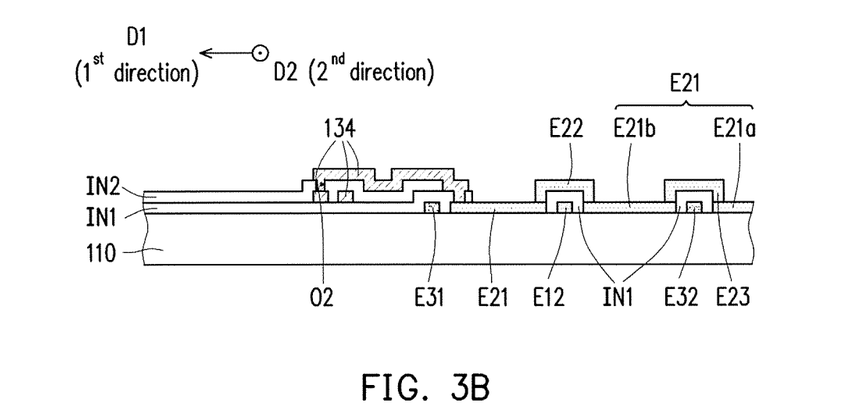
Figure 3C:
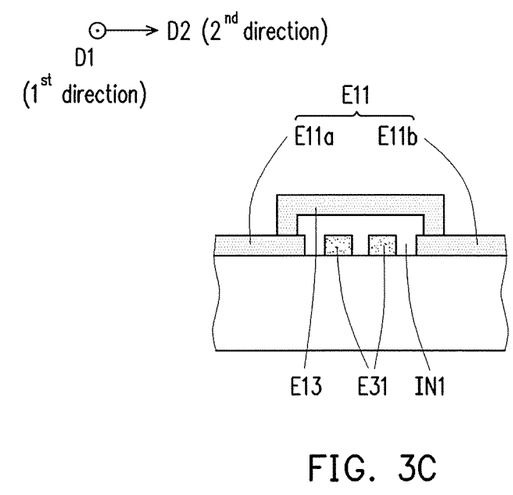

Furthermore, referring to FIG. 1 and FIG. 3C, each first sub-connection portion E13 located between adjacent two touch areas A is disposed across adjacent two third electrode patterns E31 in the adjacent two touch areas A, wherein the insulating layer IN1 may be disposed between the first sub-connection portion E13 and the third electrode patterns E31 to electrically insulate the first sub-connection portion E13 from the third electrode patterns E31. Under this configuration, the first sub-connection portion E13 located between adjacent two touch areas A is formed after the insulating layer IN1. Therefore, the first sub-connection portion E13 located between adjacent two touch areas A and the first sub-connection portion E13 located in the middle of each touch area A in FIG. 3A are formed in different processes by using the same or different materials.

Referring to FIG. 1 and FIG. 2B, a portion of the second electrode patterns E21 may respectively include a third sub-portion E21a and a fourth sub-portion E21b. Orthogonal projections of the third sub-portion E21a and the fourth sub-portion E21b on the substrate 110 have a second sub-gap G2 therebetween. Each second electrode E2 may further include a plurality of second sub-connection portions E23. An orthogonal projection of each second sub-connection portion E23 on the substrate 110 is located in one of the second sub-gaps G2, and each second sub-connection portion E23 connects one of the third sub-portions E21a and the corresponding fourth sub-portion E21b.

Referring to FIG. 1 and FIG. 3B, the second sub-connection portions E23 located in the middle of each touch area A intersect the third connection portions E32, and the third electrode patterns E31 connected with the third connection portions E32 respectively extend into and fill one of the second sub-gaps G2. The insulating layer IN1 may be disposed between the second sub-connection portions E23 and the third connection portions E32 to electrically insulate the second sub-connection portions E23 from the third connection portions E32. In this embodiment, the second sub-connection portions E23 that intersect the third connection portions E32 are formed after the insulating layer IN1. Therefore, the third connection portion E32 and the connected third sub-portion E21a and fourth sub-portion E21b are formed in different processes by using the same or different materials. In addition, the third connection portions E32 that intersect the second sub-connection portions E23 and the third electrode patterns E31 may be distributed in the same layer on the substrate 110. That is, the third connection portions E32 that intersect the second sub-connection portions E23 and the third electrode patterns E31 may be formed in the same process by using the same material. Nevertheless, the invention is not limited to the above.

Figure 3D:
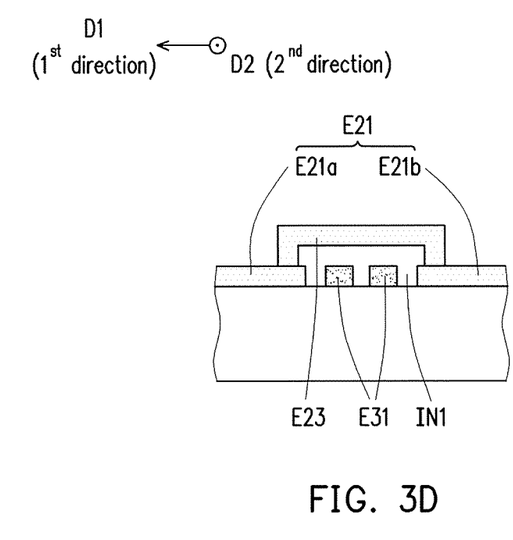

Additionally, referring to FIG. 1 and FIG. 3D, each second sub-connection portion E23 located between adjacent two touch areas A is disposed across adjacent two third electrode patterns E31 in the adjacent two touch areas A, wherein the insulating layer IN1 may be disposed between the second sub-connection portions E23 and the third electrode patterns E31 to electrically insulate the second sub-connection portions E23 from the third electrode patterns E31. Under this configuration, the second sub-connection portions E23 located between adjacent two touch areas A are formed after the insulating layer 1N1. Therefore, the second sub-connection portions E23 located between adjacent two touch areas A and the second sub-connection portions E23 located in the middle of each touch area A in FIG. 3B may be distributed in the same layer on the substrate 110. That is, the second sub-connection portions E23 located between adjacent two touch areas A and the second sub-connection portions E23 located in the middle of each touch area A in FIG. 3B may be formed in the same process by using the same material.

Referring to FIG. 1 to FIG. 2B, multiple first electrodes E1 arranged in the first direction D1 and corresponding to different touch areas A are electrically connected. For example, the first electrodes E1 in the first row of the touch area A on the upper side in FIG. 1 and the first electrode E1 in the first row of the touch area A on the lower side are connected in parallel. Multiple second electrodes E2 arranged in the second direction D2 and corresponding to different touch areas A are electrically connected in parallel. For example, the second electrodes E2 in the first column of the touch area A on the left side in FIG. 1 and the second electrode E2 in the first column of the touch area A on the right side are connected in parallel. In this embodiment, every two first electrodes are connected in parallel electrically across different areas (different touch areas A), and every two second electrodes are connected in parallel electrically across different areas (different touch areas A). Nevertheless, it should be noted that the invention is not limited thereto.

To be more specific, the touch panel 100 may include a plurality of first conductive lines 132, a plurality of second conductive lines 134, and a plurality of third conductive lines 136. Each first conductive line 132 is electrically connected with one of the first electrodes E1, and the first conductive lines 132 in different touch areas A are connected in parallel. In this embodiment, the first conductive lines 132 that are not connected in parallel intersect one another, wherein the first conductive lines 132 that intersect one another are electrically insulated by an insulating layer IN2, and a method of electrically connecting the first electrodes E1 includes forming a corresponding first opening O1 in the insulating layer IN2, such that the corresponding first conductive lines 132 are connected through the first opening O1, for example.

Each second conductive line 134 is electrically connected with one of the second electrodes E2, and the first conductive lines 132 in different touch areas A are connected in parallel. In this embodiment, the second conductive lines 134 that are not connected in parallel intersect one another, wherein the second conductive lines 134 that intersect one another are electrically insulated by the insulating layer IN2, and a method of electrically connecting the second electrodes E2 includes forming a corresponding second opening O2 in the insulating layer IN2, such that the corresponding second conductive lines 134 are connected through the second opening O2, for example.

Each third conductive line 136 is electrically connected with one of the third electrodes E3. In this embodiment, the third conductive lines 136 are disposed on the insulating layer IN2. The first conductive lines 132, the second conductive lines 134, and the third conductive lines 136 disposed on the insulating layer IN2 may be distributed in the same layer on the substrate 110. That is, the first conductive lines 132, the second conductive lines 134, and the third conductive lines 136 disposed on the insulating layer IN2 may be formed in the same process by using the same material.

However, the invention is not intended to limit the order of forming the first conductive lines 132, the second conductive lines 134, and the third conductive lines 136, and how the electrodes are electrically connected. In another embodiment, a connection circuit may be disposed on a flexible printed circuit board electrically connected with the conductive lines to electrically connect the electrodes.

The arrangement of the third electrodes E3 divides the two-dimensional touch array (including the first electrodes E1 and the second electrodes E2) into a plurality of coordinate reading areas (i.e. the touch areas A). By driving one of the two-dimensional touch array and the third electrodes E3 in a time division way as well as reading touch coordinates of the other one of the two-dimensional touch array and the third electrodes E3, a correct touch point may be determined. For example, the third electrodes E3 may serve as driving electrodes while the first electrodes E1 and the second electrodes E2 serve as sensing electrodes. During touch detection, a driving signal is inputted into the third electrodes E3 sequentially. When the touch panel 100 is touched, one of the first conductive lines 132 and one of the second conductive lines 134 output a variant voltage signal due to variation of a capacitance value. Since every two first electrodes E1 are electrically connected and every two second electrodes E2 are electrically connected, the system under the configuration of FIG. 1 obtains four possible touch points. The correct touch point may be determined by comparing the third electrodes E3 that are driven when the touch occurs. However, the driving method of the invention is not limited to the above. In another embodiment, the first electrodes E1 and the second electrodes E2 may serve as the driving electrodes while the third electrodes E3 serve as the sensing electrodes.

Under the conventional configuration without the third electrodes E3, if every two first electrodes E1 (or every two second electrodes E2) are electrically connected, the correct touch point cannot be determined. For this reason, the first electrodes need to be electrically insulated and the second electrodes E2 need to be electrically insulated. In other words, under the configuration without the third electrodes E3, a touch element that includes eight first electrodes E1 and eight second electrodes E2 requires eight pins for transmitting the driving signal and eight pins for receiving the sensing signal. That is, at least sixteen pins are required.

In contrast thereto, with the third electrodes E3, the multiple electrodes (e.g. the first electrodes E1 or the second electrodes E2) corresponding to different touch areas A in this embodiment are electrically connected with one another (that is, to share the same pins) to efficiently reduce the number of the pins required for touch detection. Under the configuration of FIG. 1, the touch element that includes eight first electrodes E1, eight second electrodes E2, and four third electrodes E3 requires four pins for receiving or transmitting the signals of the first electrodes E1, four pins for receiving or transmitting the signals of the second electrodes E2, and four pins for receiving or transmitting the signals of the third electrodes E3. In other words, in this embodiment, the number of the pins is reduced to twelve. Nevertheless, the reduction of the number of the pins may be changed according to different design requirements (e.g. the number of the electrodes, the arrangement of the touch areas, and so on) and thus is not limited to the disclosure of FIG. 1.

For example, under the conventional configuration without the third electrodes E3, a large-sized touch panel that includes 27 first electrodes E1 and 27 second electrodes E2 requires 27 pins for transmitting the driving signal and 27 pins for receiving the sensing signal. That is, at least 54 pins are required. In contract thereto, for touch areas A that include 27 first electrodes E1 and 27 second electrodes E2 and are arranged in an array of (3×3), i.e. 9 third electrodes E3 are disposed, wherein every three first electrodes E1 are electrically connected and every three second electrodes E2 are electrically connected. Under this configuration, only 9 pins are required for receiving or transmitting the signals of the first electrodes E1, 9 pins are required for receiving or transmitting the signals of the second electrodes E2, and 9 pins are required for receiving or transmitting the signals of the third electrodes E3. In other words, the number of the pins is reduced from 54 to 27.

Figure 4:
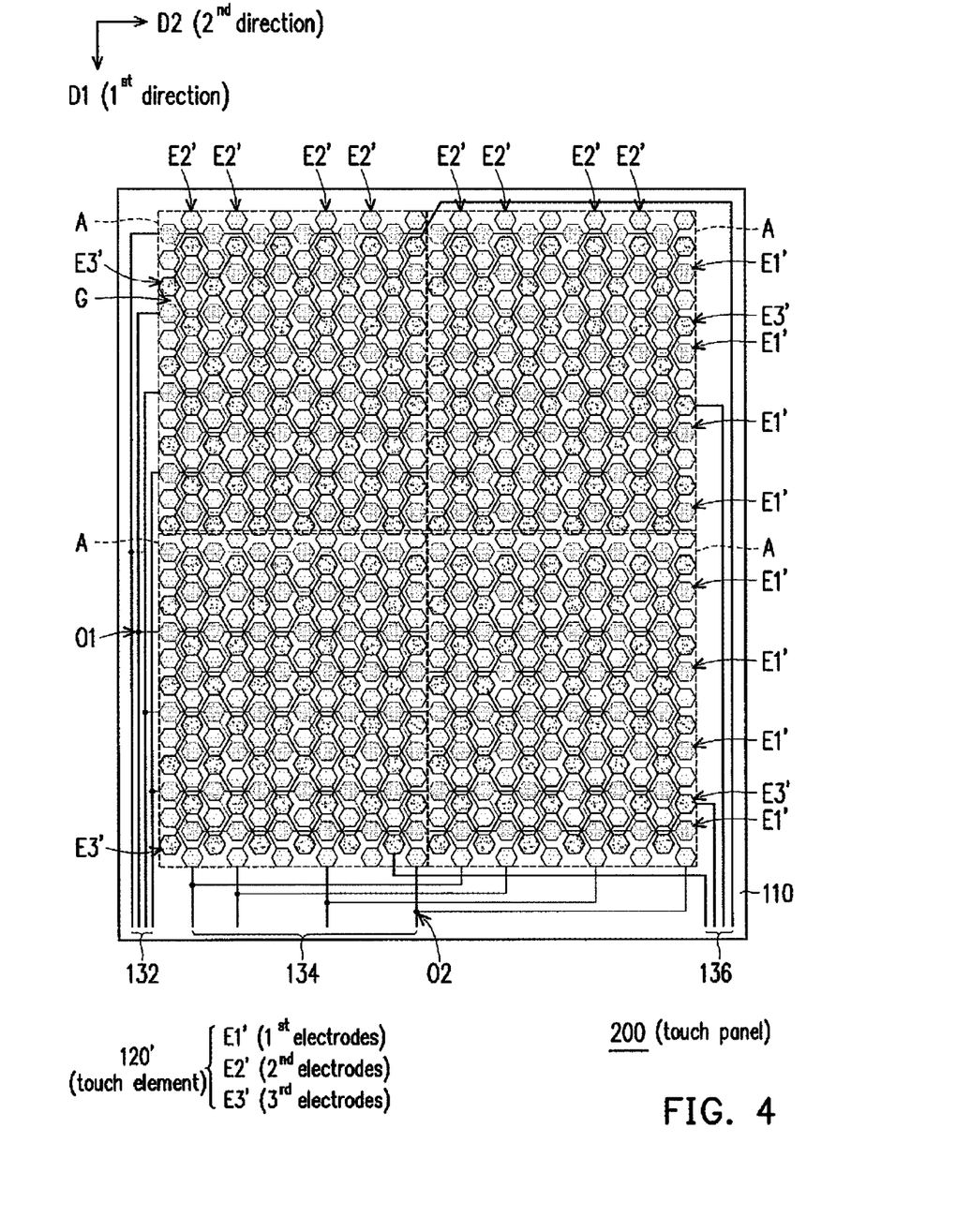
FIG. 4 is a schematic top view of a touch panel according to the second embodiment of the invention.
Figure 5A:
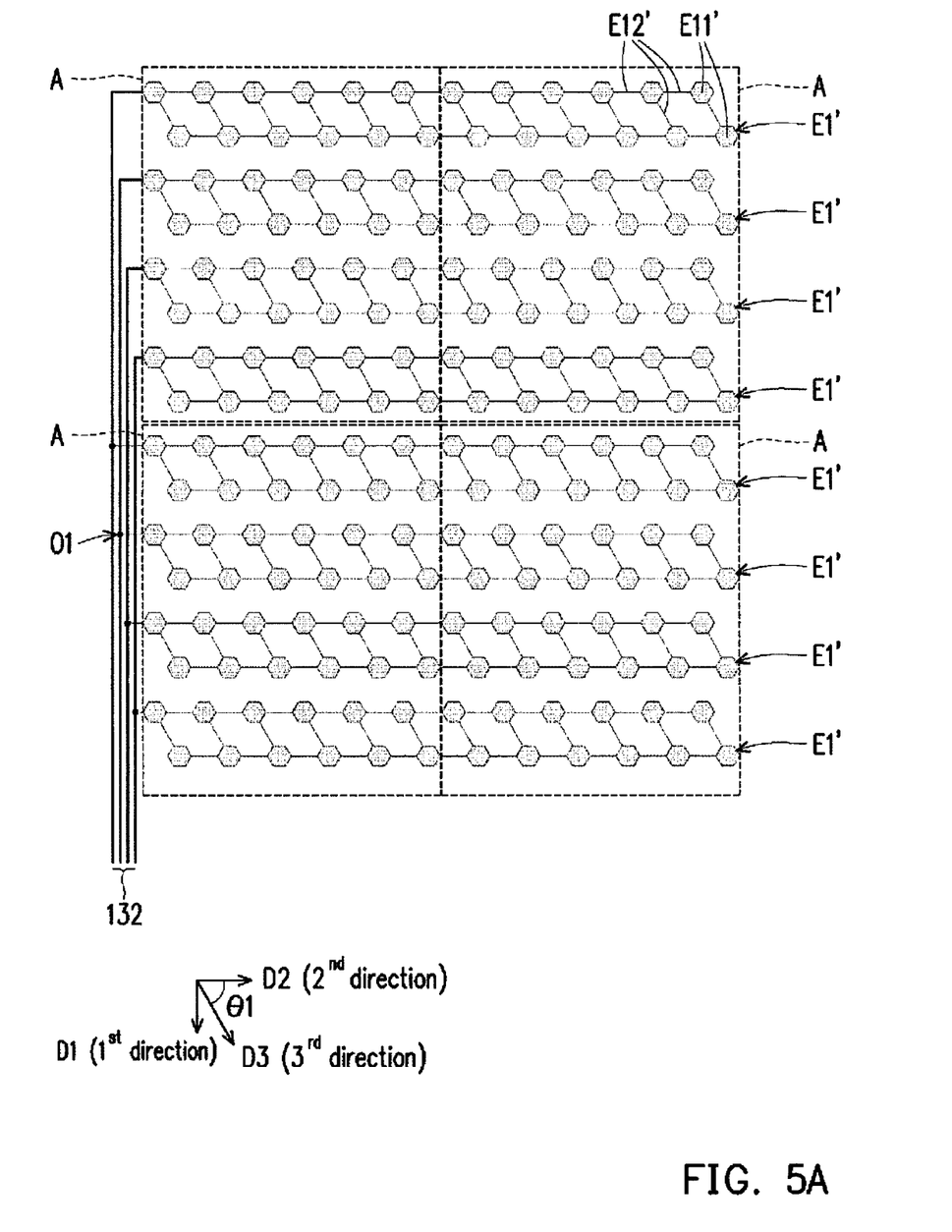
FIG. 5A to FIG. 5C are schematic exploded views of the touch element and the conductive lines in FIG. 4.
Figure 5B:
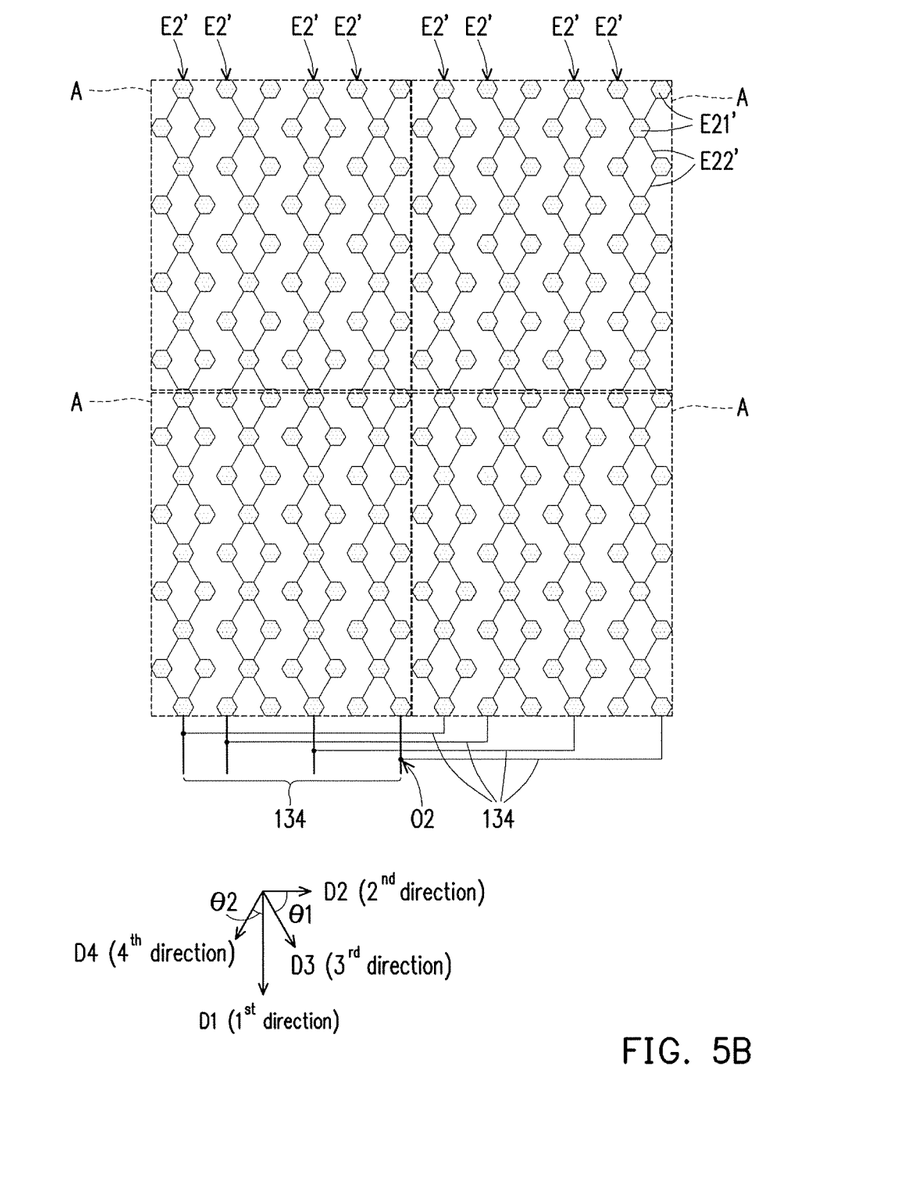
Figure 5C:
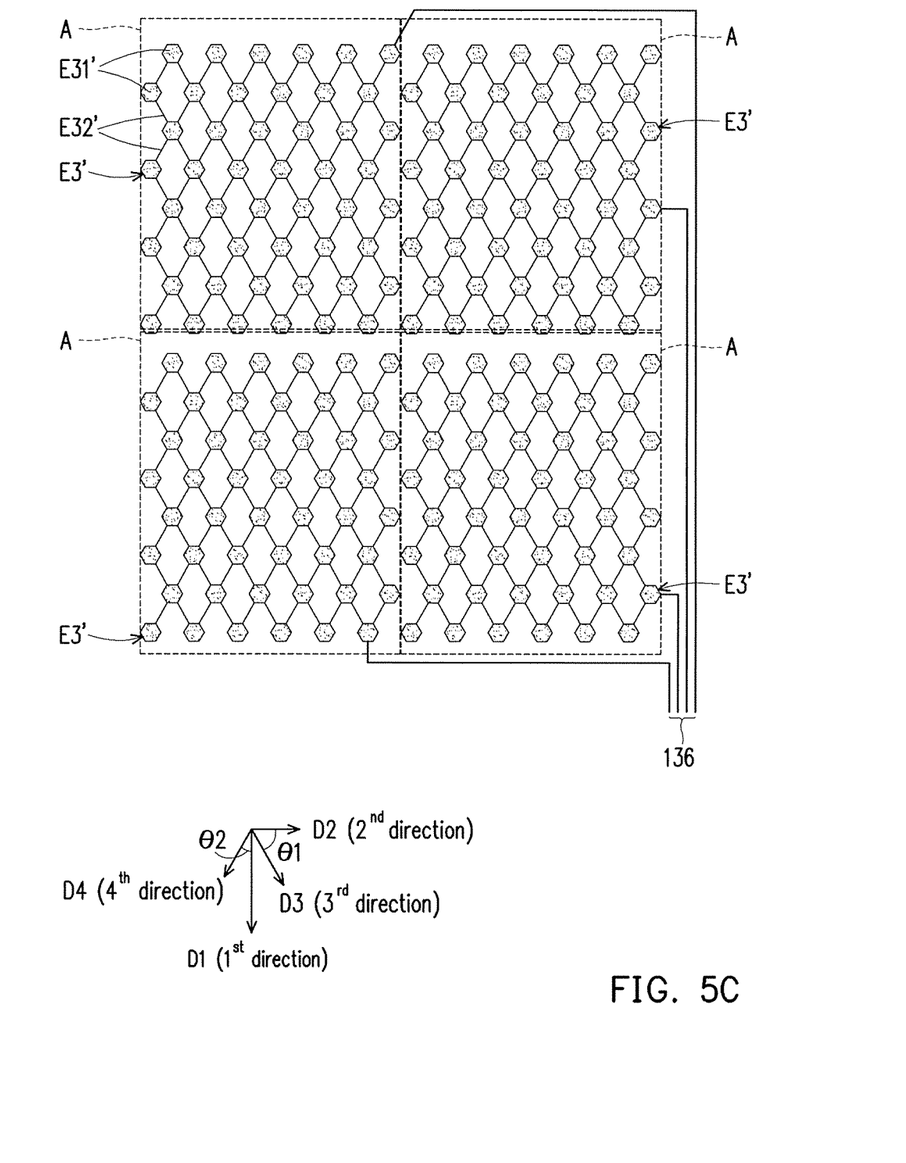

FIG. 4 is a schematic top view of a touch panel according to the second embodiment of the invention. FIG. 5A to FIG. 5C are schematic exploded views of the touch element and the conductive lines in FIG. 4. Referring to FIG. 4 to FIG. 5C, a touch panel 200 is similar to the touch panel 100 of FIG. 1. The same components are assigned with the same reference numerals and the detailed description thereof is not repeated here. Main differences between the touch panel 200 and the touch panel 100 lie in a pattern design and an arrangement of a touch element 120'.

Specifically, first electrode patterns E11' of each first electrode E1' respectively have a hexagonal shape (but not limited thereto), and at least a portion of first connection portions E12' respectively connect adjacent two first electrode patterns E11' in a third direction D3. The third direction D3 is not parallel to or perpendicular to the first direction D1 or the second direction D2, and an acute angle θ1 between the third direction D3 and the second direction D2 is 60 degrees, for example.

Second electrode patterns E21' of each second electrode E2' respectively have a hexagonal shape (but not limited thereto), and at least a portion of second connection portions E22' respectively connect adjacent two second electrode patterns E21' in the third direction D3 and a fourth direction D4. The fourth direction D4 is not parallel to or perpendicular to the first direction D1 or the second direction D2, and an acute angle θ2 between the fourth direction D4 and the first direction D1 is 30 degrees, for example. Each second connection portion E22' is disposed across at least one first connection portion E12' to connect adjacent second electrode patterns E21'. Under this configuration, an insulating layer (not shown, but may be disposed in the same manner as the insulating layer IN1 of the first embodiment) may be disposed between the second connection portion E22' and the first connection portion E12' to electrically insulate the second connection portion E22' from the first connection portion E12'.

Third electrode patterns E31' of each third electrode E3' respectively have a hexagonal shape (but not limited thereto), and at least a portion of third connection portions E32' respectively connect adjacent two third electrode patterns E31' in the third direction D3 and the fourth direction D4. In this embodiment, the first electrode patterns E11', the second electrode patterns E21', and the third electrode patterns E31' may be in the same layer. A portion of the third connection portions E32' are respectively disposed across at least one of the first connection portions E12' and at least one of the second connection portions E22'. Under this configuration, an insulating layer (not shown) may be disposed between the third connection portions E32' and the first connection portions E12' and between the third connection portions E32' and the second connection portions E22'.

To sum up, in the touch panel according to the embodiments of the invention, the touch element is divided into a plurality of touch areas and the third electrodes are additionally disposed under the configuration of the two-dimensional touch array (the first electrodes and the second electrodes). The third electrodes are disposed in the touch areas on a one-to-one basis, and the third electrode patterns of the third electrodes and the first electrode patterns and the second electrode patterns of the two-dimensional touch array are distributed in the same layer on the substrate, and the third electrode patterns fill the gaps between the first electrode patterns and the second electrode patterns. Accordingly, by electrically connecting multiple electrodes corresponding to different touch areas (that is, to share the same pins), the number of the pins required for touch detection is reduced efficiently.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A touch panel, comprising:
a substrate comprising a plurality of touch areas; and
a touch element disposed in the touch areas of the substrate and comprising:
a plurality of first electrodes arranged in a first direction in the touch areas, wherein each of the first electrodes comprises a plurality of first electrode patterns;
a plurality of second electrodes electrically insulated from the first electrodes and arranged in a second direction that intersects the first direction in the touch areas, wherein each of the second electrodes comprises a plurality of second electrode patterns, and orthogonal projections of the first electrode patterns and the second electrode patterns on the substrate have a plurality of gaps therebetween; and
a plurality of third electrodes electrically insulated from the first electrodes and the second electrodes, wherein the number of the third electrodes is the same as the number of the touch areas, and each of the touch areas is disposed with one of the third electrodes, wherein each of the third electrodes comprises a plurality of third electrode patterns and a plurality of third connection portions, orthogonal projections of the third electrode patterns on the substrate are located in the gaps, the third electrode patterns do not overlap the first electrode patterns and the second electrode patterns, and each of the third connection portions electrically insulatingly intersects at least one of the first electrodes or at least one of the second electrodes and each of the third connection portions electrically connects adjacent two third electrode patterns, wherein the first electrodes arranged in the first direction and corresponding to different touch areas are electrically connected, and the second electrodes arranged in the second direction and corresponding to different touch areas are electrically connected, so that pins needed for the first electrodes are less than the number of the first electrodes, and the pins needed for the second electrode are less than the number of the second electrodes.

2. The touch panel according to claim 1, wherein each of the first electrodes further comprises a plurality of first connection portions, and each of the first connection portions connects adjacent two first electrode patterns, each of the second electrodes further comprises a plurality of second connection portions, and each of the second connection portions connects adjacent two second electrode patterns, wherein the first electrode patterns, the second electrode patterns, and the third electrode patterns are distributed in a same layer on the substrate.

3. The touch panel according to claim 2, wherein the first electrode patterns, the second electrode patterns, and the third electrode patterns respectively have a hexagonal shape, and a portion of the third connection portions are respectively disposed across at least one of the first connection portions and at least one of the second connection portions.

4. The touch panel according to claim 2, wherein the second direction is perpendicular to the first direction.

5. The touch panel according to claim 2, wherein a portion of the first electrode patterns respectively comprise a first sub-portion and a second sub-portion, orthogonal projections of the first sub-portion and the second sub-portion on the substrate have a first sub-gap therebetween, each of the first electrodes further comprises a plurality of first sub-connection portions, an orthogonal projection of each of the first sub-connection portions on the substrate is located in one of the first sub-gaps, and each of the first sub-connection portions connects one of the first sub-portions and the corresponding second sub-portion, wherein the first sub-connection portions located in a middle of each of the touch areas intersect the third connection portions, and the third electrode patterns connected with the third connection portions respectively extend into and fill one of the first sub-gaps.

6. The touch panel according to claim 5, wherein each of the first sub-connection portions located between adjacent two touch areas is disposed across adjacent two third electrode patterns in adjacent two touch areas.

7. The touch panel according to claim 2, wherein a portion of the second electrode patterns respectively comprise a third sub-portion and a fourth sub-portion, orthogonal projections of the third sub-portion and the fourth sub-portion on the substrate have a second sub-gap therebetween, each of the second electrodes further comprises a plurality of second sub-connection portions, an orthogonal projection of each of the second sub-connection portions on the substrate is located in one of the second sub-gaps, and each of the second sub-connection portions connects one of the third sub-portions and the corresponding fourth sub-portion, wherein the second sub-connection portions located in a middle of each of the touch areas intersect the third connection portions, and the third electrode patterns connected with the third connection portions respectively extend into and fill one of the second sub-gaps.

8. The touch panel according to claim 7, wherein each of the second sub-connection portions located between adjacent two touch areas is disposed across adjacent two third electrode patterns in adjacent two touch areas.

9. The touch panel according to claim 1, wherein the touch areas are arranged in an array of (M×N), wherein M and N are positive integers respectively greater than 1, and at least one of M and N is greater than 2, the number of the touch areas is defined by (M×N), every M number of first electrodes across different touch areas are electrically connected in parallel, and every N number of second electrodes across different touch areas are electrically connected in parallel.

* * * * *